US012264636B2

(12) United States Patent
Ness et al.

(10) Patent No.: US 12,264,636 B2
(45) Date of Patent: Apr. 1, 2025

(54) LOW COMPRESSION NATURAL GAS ENGINE PISTON BOWL FOR IMPROVED COMBUSTION STABILITY

(71) Applicant: Caterpillar Inc., Peoria, IL (US)

(72) Inventors: Aaron S. Ness, Battle Ground, IN (US); Andrew J. Loetz, West Layafette, IN (US); John R. Brubaker, Battle Ground, IN (US); Christopher L. Batta, West Layafette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/511,375

(22) Filed: Nov. 16, 2023

(65) Prior Publication Data

US 2024/0093659 A1    Mar. 21, 2024

Related U.S. Application Data

(62) Division of application No. 17/677,370, filed on Feb. 22, 2022, now Pat. No. 11,840,983.

(51) Int. Cl.
*F02B 23/00* (2006.01)
*F02F 3/24* (2006.01)

(52) U.S. Cl.
CPC ..................... *F02F 3/24* (2013.01)

(58) Field of Classification Search
CPC ............. F02B 23/0672; F02B 23/0621; F02B 23/0624; F02F 3/28
USPC ....................................................... 123/661
See application file for complete search history.

(56) References Cited

U.S. PATENT DOCUMENTS

| 1,633,541 | A | 6/1927 | Lorenz |
| 3,221,718 | A | 12/1965 | Isley |
| 4,858,578 | A | 8/1989 | Schereer et al. |
| 5,081,968 | A | 1/1992 | Bruni |
| 7,243,862 | B2 | 7/2007 | Dingle |
| 8,813,712 | B2 * | 8/2014 | Bing .................. B23P 15/10 92/219 |
| 9,163,580 | B2 * | 10/2015 | Edel ..................... F02F 3/22 |
| 10,066,579 | B2 * | 9/2018 | Gniesmer ............ F02F 3/22 |
| 10,184,388 | B1 | 1/2019 | Ahmad |

(Continued)

FOREIGN PATENT DOCUMENTS

| EP | 2063081 B1 | 8/2016 |
| FR | 2880385 A1 | 7/2006 |
| IN | 201621045122 A | 12/2019 |

OTHER PUBLICATIONS

Written Opinion and International Search Report for Int'l Patent Appln. No.PCT/US2023/061447, mailed Jun. 9, 2023 (9 pgs).

*Primary Examiner* — Long T Tran
*Assistant Examiner* — James J Kim
(74) *Attorney, Agent, or Firm* — Brannon Sowers & Cracraft PC

(57) ABSTRACT

A piston may have an annular body including a crown portion defining a longitudinal axis, a radial direction perpendicular to the longitudinal axis, a plane containing the longitudinal axis and the radial direction, and a contoured combustion bowl. In the plane containing the longitudinal axis and the radial direction, the crown portion includes a radially outer squish surface, and a swirl pocket having a reentrant surface that extends axially downwardly and radially outwardly from the squish surface defining a tangent that forms a reentrant angle with the squish surface that ranges from 53.0 degrees to 57.0 degrees.

19 Claims, 3 Drawing Sheets

(56) References Cited

U.S. PATENT DOCUMENTS

| | | |
|---|---|---|
| 10,294,876 B2 | 5/2019 | Laget et al. |
| 10,400,663 B2 | 9/2019 | Ness |
| 10,718,258 B2* | 7/2020 | Solomon ............... F02B 17/005 |
| 10,815,871 B2 | 10/2020 | Saad et al. |
| 2002/0046593 A1* | 4/2002 | Ribeiro ................. F02F 3/0023 |
| | | 29/888.09 |
| 2011/0119914 A1* | 5/2011 | Janssen .................. B23K 20/12 |
| | | 92/260 |
| 2011/0146613 A1 | 6/2011 | Oxborrow |
| 2012/0080004 A1 | 4/2012 | Menezes et al. |
| 2014/0331961 A1* | 11/2014 | Ness ................... F02B 23/0651 |
| | | 123/294 |
| 2016/0169153 A1 | 6/2016 | Burger et al. |
| 2017/0122248 A1* | 5/2017 | Azevedo .................... F16J 9/12 |
| 2019/0112968 A1 | 4/2019 | Choi |
| 2019/0186341 A1* | 6/2019 | Ness ................... F02B 23/0621 |

\* cited by examiner

LOW COMPRESSION NATURAL GAS ENGINE PISTON BOWL FOR IMPROVED COMBUSTION STABILITY

The present disclosure is a divisional of U.S. patent application Ser. No. 17/677,370, filed Feb. 22, 2022, the contents of which are hereby incorporated by reference in its entirety.

TECHNICAL FIELD

The present disclosure relates generally to pistons that are used in internal combustion engines having a contoured piston bowl geometry with a reentrant surface. More specifically, the present disclosure relates to a piston having a contoured piston bowl geometry with a reentrant surface that may improve combustion stability in a low compression natural gas engine.

BACKGROUND

Internal combustion engines are routinely used in various industries to power machines and equipment. Examples of industries using such machines and equipment include marine, earth moving, construction, mining, locomotive and agriculture industries, etc. In certain markets and market segments, natural gas engines require a low compression ratio and a good combustion stability in order to meet environmental standards while also being economical to run.

More specifically, it has been traditionally found that a tradeoff or compromise exists between providing a natural gas engine with a high power output while also having a high combustion efficiency simultaneously. In some cases, the limits for emissions of unburned hydrocarbons are undesirably approached, risking exceeding these limits.

India Publ. Pat. Application No. 201621045122 A (the '122 patent application) discloses a piston with a recessed combustion chamber on the piston head for improving the speed of combustion. The piston may further comprise the recessed combustion chamber faced towards a cylinder head with an injector. The injector is a fuel injector for introduction of fuel into the combustion chamber, where the mixture of fuel and air is allowed to burn. The inner structural design of the combustion chamber may be formed into a circular shape of a rotating body with an axis in the direction of the translatory movement of the piston. At the piston head, an opening is formed by configuring a series of interconnected lobes in the shape of a flower. The complete assembly further increases the speed of combustion enabled by better mixing of air and fuel which results in lowering the NOx emission and Particulate matter emission.

As can be seen, the '122 patent application claims to improve combustion stability, but does claim to increase both combustion stability, and power output simultaneously.

SUMMARY OF THE DISCLOSURE

A piston configured to reciprocate in the bore of an engine according to an embodiment of the present disclosure is provided The piston may comprise an annular body including a crown portion defining a longitudinal axis, a radial direction perpendicular to the longitudinal axis, a plane containing the longitudinal axis and the radial direction, and a contoured combustion bowl. In the plane containing the longitudinal axis and the radial direction, the crown portion may include a top squish surface, and a swirl pocket having a reentrant surface that extends axially downwardly and radially outwardly from the top squish surface defining a tangent that forms a reentrant angle with the top squish surface that may range from 53.0 degrees to 57.0 degrees.

A piston configured to reciprocate in the bore of an engine according to another embodiment of the present disclosure is provided. The piston may comprise an annular body including a crown portion defining a longitudinal axis, a radial direction perpendicular to the longitudinal axis, a plane containing the longitudinal axis and the radial direction, and a contoured combustion bow. In the plane containing the longitudinal axis and the radial direction, the contoured combustion bowl may be radially surrounded by an annular cooling gallery that defines a maximum annular radial width, while the contoured combustion bowl may have a swirl pocket including a cylindrical surface defining a minimum diameter of the swirl pocket radially proximate to the maximum annular radial width of the cooling gallery. A ratio of the minimum diameter to the maximum annular radial width may range from 6.3 to 7.7.

A piston configured to reciprocate in the bore of an engine according to yet another embodiment of the present disclosure is provided. The piston may comprise an annular body including a crown portion defining a longitudinal axis, a radial direction perpendicular to the longitudinal axis, a plane containing the longitudinal axis and the radial direction, and a contoured combustion bowl. In the plane containing the longitudinal axis and the radial direction, the contoured combustion bowl may define a maximum axial depth measured from a planar squish surface to a bottom concave arcuate surface defining a bottom extremity of a swirl pocket, and the swirl pocket may include a concave arcuate side surface that is spaced axially away from the squish surface, and the bottom concave arcuate surface. The concave arcuate side surface may define an axial height, and a ratio of the maximum axial depth of the contoured combustion bowl to the axial height may range from 6.9 to 8.4.

A combustion chamber of an engine comprising a bore of the engine with a bore diameter, a longitudinal axis, a radial direction perpendicular to the longitudinal axis, and a piston configured to reciprocate in the bore of the engine according to an embodiment of the present disclosure is provided. The piston may reciprocate from a top dead center position to a bottom dead position defining a compression height therebetween. The piston may also include an annular body including a crown portion and defining a plane containing the longitudinal axis and the radial direction, and a contoured combustion bowl. In the plane containing the longitudinal axis and the radial direction, the contoured combustion bowl may define a maximum axial depth measured from a planar squish surface to a bottom concave arcuate surface defining a bottom extremity of a swirl pocket. A ratio of the compression height to the maximum axial depth may range from 5.0 to 15.0.

DETAILED DESCRIPTION

Figure 1:
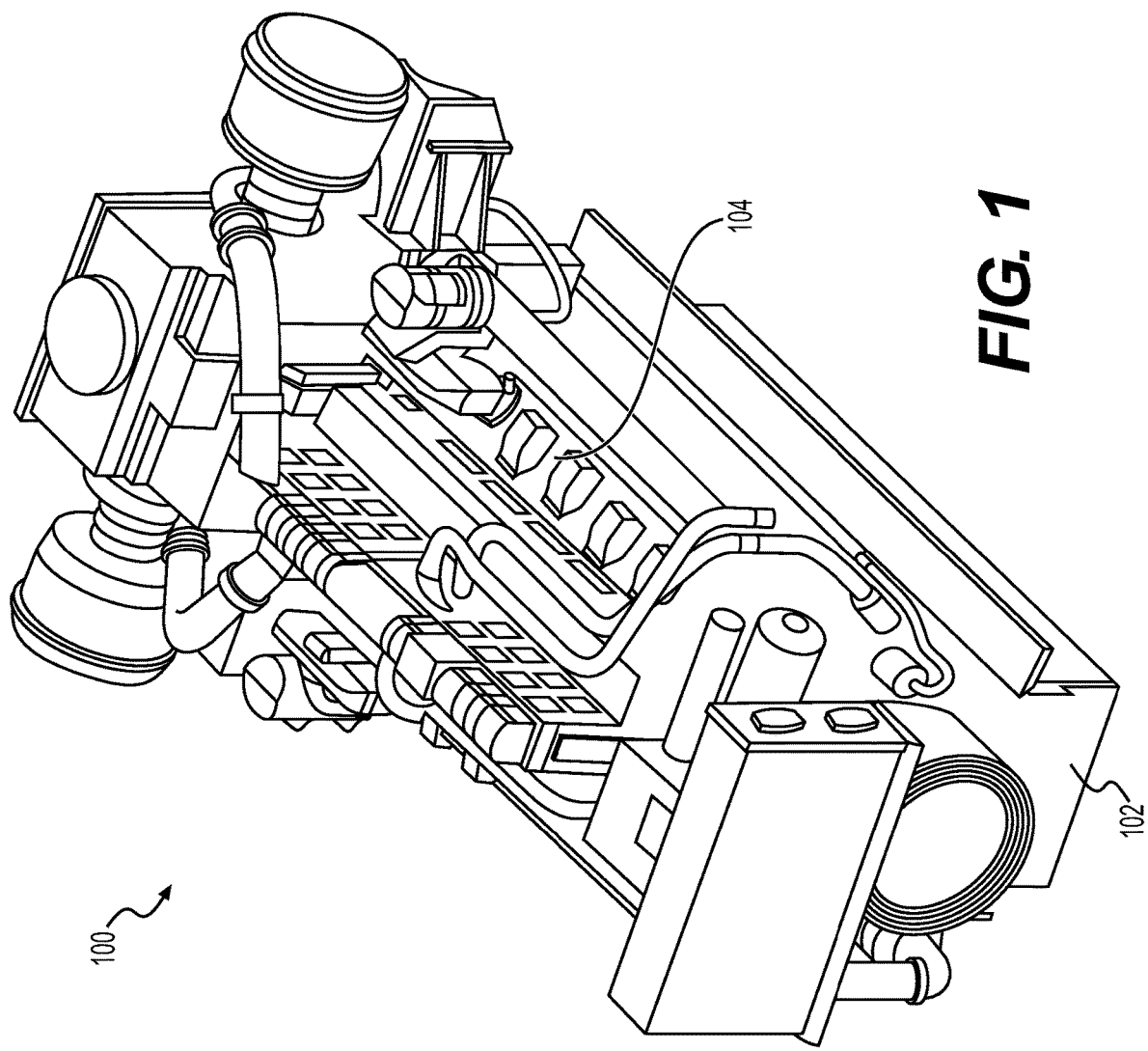
FIG. 1 is a perspective view of an internal combustion engine that may employ piston(s) configured according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of a piston with a new bowl is disclosed that may meet engine performance goals and fit into a new piston architecture. The new bowl may have a maximized volume due to its depth and diameter, providing for a low geometric compression ratio. At the same time, a relatively high squish velocity to maximize total kinetic energy in the in-cylinder gas mixture has been maintained through utilization of a reentrant feature at the bowl opening. Also, a proper ratio of combustion volume in the bowl versus cooling volume in a cooling gallery may be provided. These combination of features may provide reduced piston temperatures, reduced unburned hydrocarbons, and improved combustion efficiency when the engine is operated at is its rated load.

For example, an internal combustion engine 100 is shown in FIG. 1 that may employ various embodiments of the piston constructed according to the principles set forth herein. The engine 100 may include an engine block 102 in which the piston (not shown) reciprocates, and a cylinder head 104 that may contain various engine components for the introduction of fluids into the bore/combustion chamber located in the engine block 102.

Figure 2:
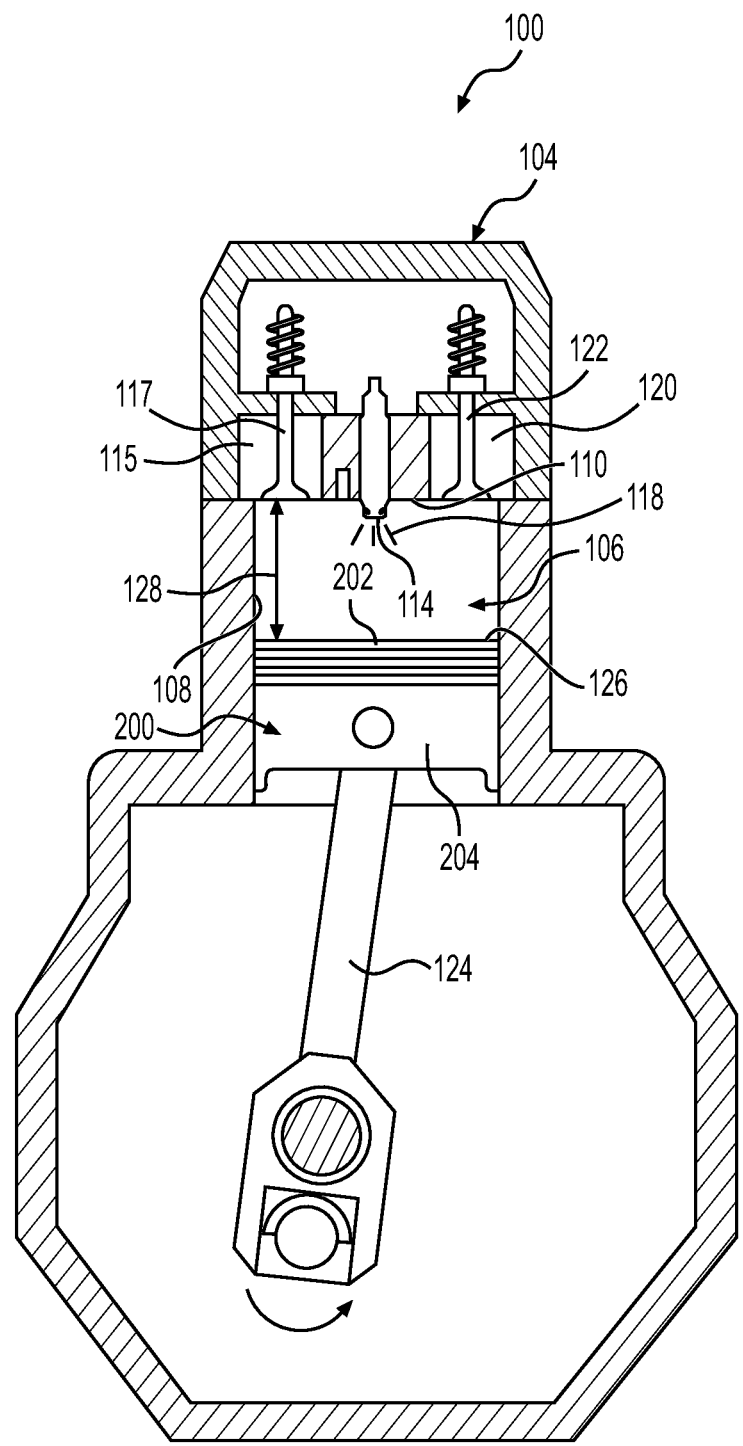
FIG. 2 is a sectioned side view of the internal combustion engine of FIG. 1, showing generically a combustion chamber with a piston that may be configured according to an embodiment of the present disclosure that is disposed in a cylinder bore for reciprocating movement therein.

Turning to FIG. 2, a portion of the engine 100 is shown sectioned, revealing the combustion chamber 106 that may have a generally cylindrical shape that is defined within a cylinder bore 108 formed within the crankcase or engine block 102 of the engine 100. The combustion chamber 106 is further defined at one end by a flame deck surface 110 of the cylinder head 104, and at another end by a crown portion 202 of a piston 200 that is reciprocally disposed within the bore 108, and is connected to a connecting rod 124 at its connecting rod attachment portion 204, which in turn is connected to a crank shaft (not shown).

During operation of the engine 100, air is admitted into the combustion chamber 106 an air inlet passage 115 when one or more intake valves 117 (one shown) are open during an intake stroke. In a known configuration, high pressure fuel is permitted to flow into a pre-chamber to mix with the intake air to create a pre-determined fuel/air mixture. A spark is created by a spark plug 114 to ignite the mixture that results in burning and expanding gases 118. Following combustion, exhaust gas is expelled from the combustion chamber through an exhaust conduit 120 when one or more exhaust valves 122 (one shown) is/are open during an exhaust stroke.

While a gas engine has been just described in detail, it is to be understood that the embodiments described herein may also be used in diesel and/or compression ignition engines.

The uniformity and extent of fuel/air mixing in the combustion cylinder is relevant to the combustion efficiency as well as to the amount and type of combustion byproducts that are formed. For example, fuel-rich mixtures, which may be locally present within the combustion chamber 106 during a combustion event due to insufficient mixing, may lead to higher nitrogen oxides and unburned carbon emissions and lower combustion efficiency.

Figure 3:
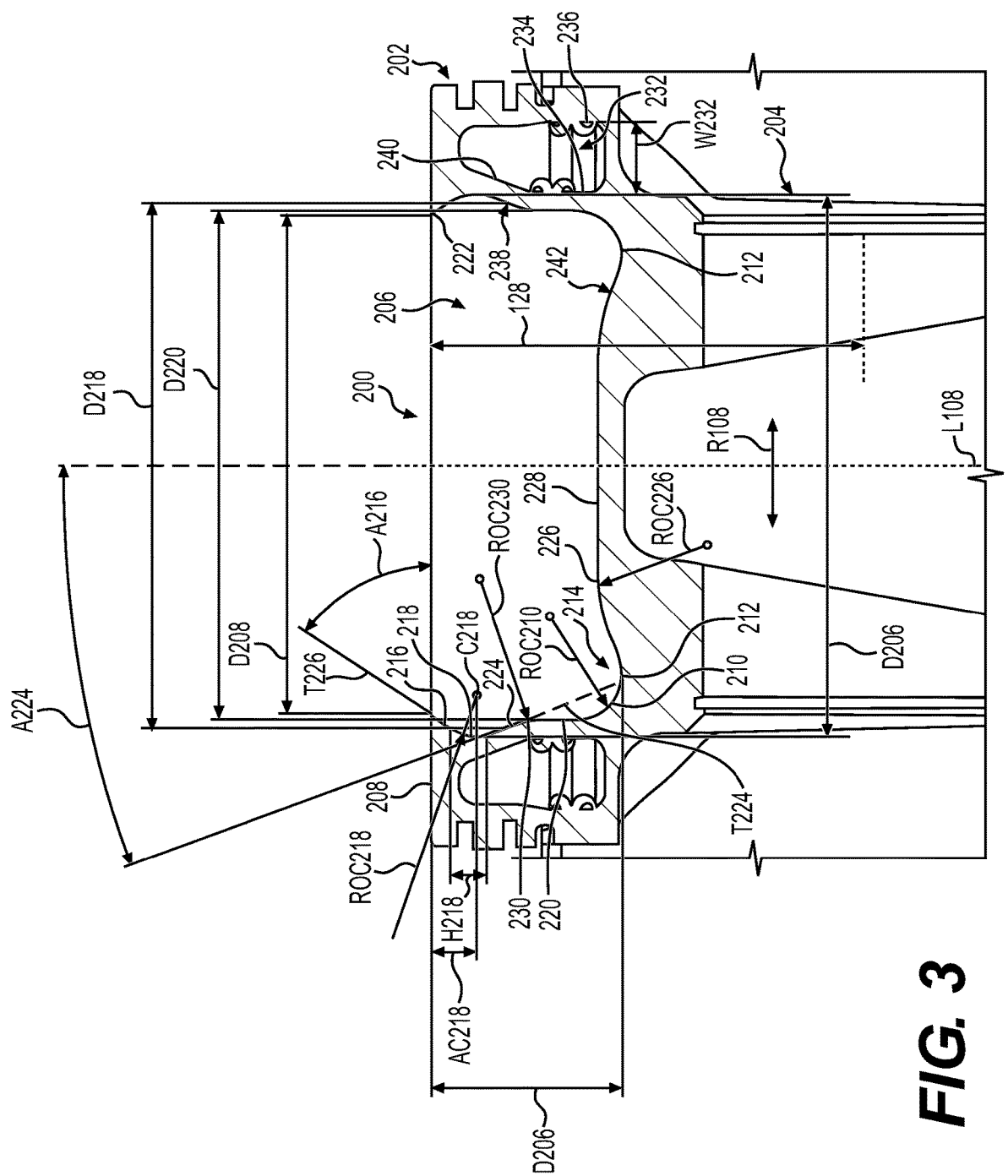
FIG. 3 is a sectional view of a piston that may be disposed in the combustion chamber of FIG. 2.

In particular embodiments of the present disclosure as understood looking at FIGS. 2 and 3 together, the combustion chamber 106 defines a bore 108 of the engine with a longitudinal axis L108, and a radial direction R108 perpendicular to the longitudinal axis. A piston 200 is shown in the bore that is configured to reciprocate in the bore of the engine from a top dead center position to a bottom dead position 126 as nearly shown in FIG. 3, defining a compression height 128 between these positions.

As best seen in FIG. 3, the piston 200 may have an annular body including a crown portion 202 that defines a plane containing the longitudinal axis L108, and the radial direction R108 when installed. It is to be understood that the annular body of the piston may itself define similar axes, and directions when not in the bore of the engine, but would be coincident or nearly coincident with those of the bore when installed in the bore. Also, a skirt 204 is shown that may be a full skirt in some embodiments of the present disclosure. This may not be the case in other embodiments of the present disclosure. The skirt and the crown portion may be unitary, integral, etc.

The piston also has a contoured combustion bowl 206, and in the sectioned plane of FIG. 3, which contains the longitudinal axis L108 and the radial direction R108, defines a maximum axial depth D206 measured from a planar squish surface 208 (or a plane containing this surface) to a bottom concave arcuate surface 210 defining a bottom extremity 212 of a swirl pocket 214 (so called since it promotes mixing and atomization of the fuel in the air to help improve combustion efficiency). A ratio of the compression height 128 of the piston to the maximum axial depth D206 may range from 2.05 to 2.475 (e.g., about 2.26) in some embodiments of the present disclosure. Such a range may be considered to provide a low geometric compression ratio. In such an embodiment, a ratio of a maximum diameter D206 of the combustion bowl defined by the concave arcuate side surface to a minimum diameter of the combustion chamber defined by a cylindrical surface (see D220) may range from 1.02 to 1.24.

Also, the contoured combustion bowl 206 may include a reentrant surface 216 extending from the planar squish surface 208 at a reentrant angle A216 in the sectioned plane of FIG. 3, and a concave arcuate side surface 218 that extends axially downwardly from the reentrant surface 216 defining an axial height H218 of the concave arcuate side surface 218. In some embodiments the reentrant angle ranges from 53.0 degrees to 57.0 degrees, and a ratio of the compression height 128 to the axial height H218 ranges from 5.0 to 15.0, or more specifically 10.0 to 12.0 (may be approximately 11.0). It should be noted that the compression height is most accurately portrayed in FIG. 2, as what is shown in FIG. 3 is an approximation of the compression height as it generally represents the amount of movement of the piston.

More specifically, the concave arcuate side surface 218 of the swirl pocket 214 may be spaced axially away from the planar squish surface 218 (i.e., other surfaces are interposed such as the reentrant surface 216, etc.), as well as the bottom concave arcuate surface 210. For example, the swirl pocket 214 may include a cylindrical surface 220 (i.e. has less than 7.0 degrees of a draft angle) that defines a minimum diameter D220 of the swirl pocket 214 that ranges from 111.0 millimeters to 114.0 millimeters in some embodiments of the present disclosure. Also, a ratio of the maximum axial depth D206 of the contoured combustion bowl 206 to the axial height H218 of the concave arcuate side surface 218 may range from 6.9 to 8.4 (may be about 7.6) in some embodiments of the present disclosure.

Specific geometric values may include the following. A small radius 222 may connect the planar squish surface 208 to the reentrant surface 216 in some embodiments of the present disclosure (e.g., may have a value of 0 to 0.2 mm (or about 0.1 mm in the sectioned plane of FIG. 3)). In addition, the planar squish surface 208 (with the small radius 222 if present) may define an entry diameter D208 that ranges from 109.0 millimeters to 113.0 millimeters in some embodiments of the present disclosure. Similarly, the concave arcuate side surface 218 defines a minimum arcuate surface diameter D218 that ranges from 115.0 millimeters to 118.0 millimeters, while the maximum axial depth D206 of the contoured combustion bowl 206 ranges from 41.0 millimeters to 44.0 millimeters. Other dimensional ranges are possible in other embodiments of the present disclosure such as when the design is scaled up or down, etc.

Still referring to the sectioned plane of FIG. 3, the crown portion 202 may include a top squish surface (e.g., may take the form of the planar squish surface 208 as alluded to earlier herein), and a reentrant surface 216 that extends axially downwardly and radially outwardly from the top squish surface (or planar squish surface 208) that defines a tangent T216 that forms a reentrant angle A216 with the top squish surface that ranges from 53.0 degrees to 57.0 degrees in some embodiments. The reentrant surface may take various shapes including arcuate, or conical as shown in FIG. 3. If so, the tangent T216, and the reentrant surface 216 may look or act like one in the same.

As also alluded to earlier herein, the swirl pocket 214 further includes a concave arcuate surface (e.g., concave arcuate side surface 218) extending from the reentrant surface 216, defining a radius of curvature ROC218 that ranges from 8.5 millimeters to 10.5 millimeters in the sectioned plane of FIG. 3 in some embodiments of the present disclosure. If so, the center C218 of this radius of curvature may be disposed an axial distance AC218 from the top squish surface (or a plane containing the planar squish surface 208) ranging from 9.5 millimeters to 10.0 millimeters in some embodiments of the present disclosure. Also, the concave arcuate surface may be an exact radius, but not necessarily so. As used herein, the term "arcuate" means any surface that is not conical or planar, and may include a radius, radii, an ellipse, a spline, a polynomial, etc.

Furthermore, a converging surface 224 may extend radially inwardly from the concave arcuate surface toward the longitudinal axis L108, defining a lower tangent T224 that forms an acute angle A224 with the longitudinal axis L108 in the sectioned plane of FIG. 3 that ranges from 18.0 millimeters to 22.0 millimeters in some embodiments of the present disclosure. As with the reentrance surface, the converging surface 224 may also be conical, but not necessarily so.

As mentioned previously herein, the swirl pocket 214 may have a cylindrical surface 220 extending axially downwardly from the converging surface 224, as well as a concave bottom extremity defining surface (e.g., see bottom concave arcuate surface 210 defining a bottom extremity 212) extending from the cylindrical surface 220. A convex arcuate surface 226 may extend upwardly from the concave bottom extremity defining surface to a flat plateau surface 228 (i.e., this surface may be flat within 0.5 mm or less) that is perpendicular to the longitudinal axis L108.

With continued reference to FIG. 3, a radius 230 or other arcuate surface may connect the converging surface 224 to the cylindrical surface 220 having a radius of curvature ROC230 ranging from 13.0 millimeters to 17.0 millimeters in some embodiments of the present disclosure. Plus, the concave bottom extremity defining surface (e.g., may take the form of bottom concave arcuate surface 210) may have a radius of curvature ROC210 that ranges from 8.0 millimeters to 12.0 millimeters, while the convex arcuate surface 226 may have a radius of curvature ROC226 that ranges from 50.0 millimeters to 54.0 millimeters in some embodiments of the present disclosure.

While the previous embodiments of the piston have been directed to those that maximize power output without sacrificing combustion efficiency or stability, the next embodiment is more concerned with piston temperatures so that they are not too high, etc.

For example, in the sectioned plane of FIG. 3, the contoured combustion bowl 206 may be radially surrounded by an annular cooling gallery 232 that defines a maximum annular radial width W232. Moreover, the contoured combustion bowl 206 may have a swirl pocket including a cylindrical surface 220 defining a minimum diameter D220 of the swirl pocket 214 that is disposed radially proximate to the maximum annular radial width W232 of the cooling gallery. In some embodiments, a ratio of the minimum diameter to the maximum annular radial width W232 ranges from 6.3 to 7.7.

More particularly, the annular cooling gallery 232 may define a radially inner cylindrical surface 234, and a radially outer cylindrical surface 236 that defines the maximum annular radial width W232 of the annular cooling gallery 232. Also, the swirl pocket 214 may further include a conical diverging surface 238 extending radially outwardly, and axially upwardly from the cylindrical surface 220 of the swirl pocket 214, whereas the annular cooling gallery 232 may further include a conical surface 240 that is radially proximate to the conical diverging surface 238, and that is parallel to the conical diverging surface 238. Hence, the local wall thickness of the piston between these features is maintained relatively constant.

Still referring to the sectioned plane of FIG. 3, the swirl pocket 214 may further have a concave arcuate surface (e.g. concave arcuate side surface 218) extending upwardly from the conical diverging surface 238 to a reentrant surface 216 that extends to a planar squish surface 208.

At the bottom of the swirl pocket 214, an undulating surface 242 may extend axially downwardly and radially inwardly from the cylindrical surface 220 of the swirl pocket to a bottom extremity 212 of the swirl pocket, and then radially inwardly and axially upwardly to a flat plateau surface 228 (i.e., within 0.5 mm of being flat) and spaced away from the squish surface an axial depth of about 37.0 millimeters in some embodiments of the present disclosure. In other embodiments, surface 228 may be arcuate, etc.

The configuration, ratios and dimensional ranges of any of the features of any of the embodiments discussed herein may be altered to be different than what has been explicitly discussed or shown depending on the application.

The piston may be fabricated from steel (e.g., tool steel, stainless steel, etc.), cast aluminum alloy, forged aluminum alloy or other suitable material that is durable, corrosion resistant, etc. The geometry of the crown portion may be formed during the casting or forging process and then may be rough machined and/or finish machined if necessary. Suitable machining processes may include milling, turning, electrical discharge machining, etc.

Since a turning process is used to create some or all of the finished geometry of the piston, it can be readily understood by one skilled in the art that most, almost all, or all of the finished geometry of these components may not vary, or may not vary significantly, along the circumferential direction about the longitudinal axis.

INDUSTRIAL APPLICABILITY

In practice, a piston, a crown portion of a piston, a combustion chamber, and/or an engine assembly using any of these components according to any embodiment described herein may be provided, sold, manufactured, and bought etc. as needed or desired in an aftermarket or OEM (original equipment manufacturer) context. For example, a crown portion or a piston may be used to retrofit an existing engine already in the field or may be sold with an engine or a piece of equipment using that engine at the first point of sale of the piece of equipment.

The inventors have found that the selected bowl geometry facilitates a balance between low compression ratio, high squish velocity, and effective cooling of the bowl rim and top land. Other designs may be able to achieve the same low compression ratio, but would likely sacrifice the desired squish velocity or the desired amount of cooling.

Put another way, various embodiments of the present disclosure break the tradeoff between increasing power output using a low compression ratio, and improving combustion efficiency simultaneously.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A piston configured to reciprocate in the bore of an engine, the piston comprising:
   an annular body including a crown portion defining a longitudinal axis, a radial direction perpendicular to the longitudinal axis, a plane containing the longitudinal axis and the radial direction, and a contoured combustion bowl;
   wherein in the plane containing the longitudinal axis and the radial direction, the contoured combustion bowl is radially surrounded by an annular cooling gallery that defines a maximum annular radial width, the contoured combustion bowl has a swirl pocket including a cylindrical surface defining a minimum diameter of the swirl pocket radially proximate to the maximum annular radial width of the annular cooling gallery, and a ratio of the minimum diameter to the maximum annular radial width ranges from 6.3 to 7.7; and
   wherein the swirl pocket further includes a conical diverging surface extending radially outwardly, and axially upwardly from the cylindrical surface of the swirl pocket, and the annular cooling gallery further includes a conical surface that is radially proximate to the conical diverging surface, and that is parallel to the conical diverging surface.

2. The piston of claim 1, wherein the annular cooling gallery defines a radially inner cylindrical surface, and a radially outer cylindrical surface that defines the maximum annular radial width of the annular cooling gallery.

3. The piston of claim 1, wherein the swirl pocket further comprises a concave arcuate surface extending upwardly from the conical diverging surface to a reentrant surface that extends to a planar squish surface.

4. The piston of claim 1, wherein the swirl pocket further comprises an undulating surface that extends axially downwardly and radially inwardly from the cylindrical surface of the swirl pocket to a bottom extremity of the swirl pocket, and then radially inwardly and axially upwardly to a flat plateau surface.

5. A piston configured to reciprocate in the bore of an engine, the piston comprising:
   an annular body including a crown portion defining a longitudinal axis and having a squish surface, a radial direction perpendicular to the longitudinal axis, a plane containing the longitudinal axis and the radial direction, and a contoured combustion bowl;

wherein in the plane containing the longitudinal axis and the radial direction, the contoured combustion bowl is radially surrounded by an annular cooling gallery that defines a maximum annular radial width;

the contoured combustion bowl has a swirl pocket including a cylindrical surface, and a diverging surface extending radially, and axially upwardly in a direction of the squish surface, from the cylindrical surface; and the cylindrical surface defining a minimum diameter of the swirl pocket radially proximate to the maximum annular radial width of the annular cooling gallery, and a ratio of the minimum diameter to the maximum annular radial width ranges from 6.3 to 7.7.

6. The piston of claim 5 wherein the swirl pocket further includes a reentrant surface extending axially upwardly from the diverging surface, and wherein the squish surface is planar.

7. The piston of claim 6 wherein the swirl pocket further includes a concave arcuate side surface transitioning between the cylindrical surface and the reentrant surface.

8. The piston of claim 5 wherein the swirl pocket further includes an undulating surface extending axially downwardly and radially inwardly from the cylindrical surface to a plateau surface located axially downward from the cylindrical surface.

9. The piston of claim 7 wherein the plateau surface is flat.

10. The piston of claim 5 wherein the annular cooling gallery includes a cooling gallery inner surface that extends parallel to the diverging surface, and a wall thickness is defined between the cooling gallery inner surface and the diverging surface.

11. The piston of claim 10 wherein the diverging surface extends radially outwardly from the cylindrical surface.

12. The piston of claim 11 wherein the diverging surface is conical.

13. A piston configured to reciprocate in the bore of an engine, the piston comprising:

an annular body including a crown portion defining a longitudinal axis, a radial direction perpendicular to the longitudinal axis, a plane containing the longitudinal axis and the radial direction, and a contoured combustion bowl;

wherein in the plane containing the longitudinal axis and the radial direction, the contoured combustion bowl is radially surrounded by an annular cooling gallery that defines a maximum annular radial width, the contoured combustion bowl has a swirl pocket including a cylindrical surface defining a minimum diameter of the swirl pocket radially proximate to the maximum annular radial width of the annular cooling gallery; and wherein the swirl pocket further includes a diverging surface extending radially outward and axially upward of the cylindrical surface, and the annular cooling gallery further includes a cooling gallery inner surface that is radially proximate to the diverging surface, and the cooling gallery inner surface is arranged parallel to the diverging surface, such that a local wall thickness defined between the diverging surface and the cooling gallery inner surface and extending from the swirl pocket to the annular cooling gallery is constant.

14. The piston of claim 13 wherein a ratio of the minimum diameter to the maximum annular radial width ranges from 6.3 to 7.7.

15. The piston of claim 13 wherein each of the diverging surface and the cooling gallery inner surface is conical.

16. The piston of claim 13 wherein the swirl pocket includes a reentrant surface extending to a squish surface.

17. The piston of claim 13 wherein, in the plane containing the longitudinal axis and the radial direction and at a location axially between the diverging surface and the squish surface, the annular cooling gallery defines a cooling gallery radial width that is greater than the wall thickness.

18. The piston of claim 13 wherein the annular cooling gallery defines a radially inner cylindrical surface, and a radially outer cylindrical surface that defines the maximum annular radial width of the annular cooling gallery.

19. The piston of claim 13 wherein the swirl pocket further includes an undulating surface extending axially downwardly and radially inwardly from the cylindrical surface to a plateau surface located axially downward from the cylindrical surface.

* * * * *